May 9, 1967   J. H. SHOEMAKER   3,318,142
DEVICE FOR DETERMINING THE ELONGATION
CHARACTERISTICS OF ELONGATED ARTICLES
Filed Feb. 10, 1964   3 Sheets-Sheet 1
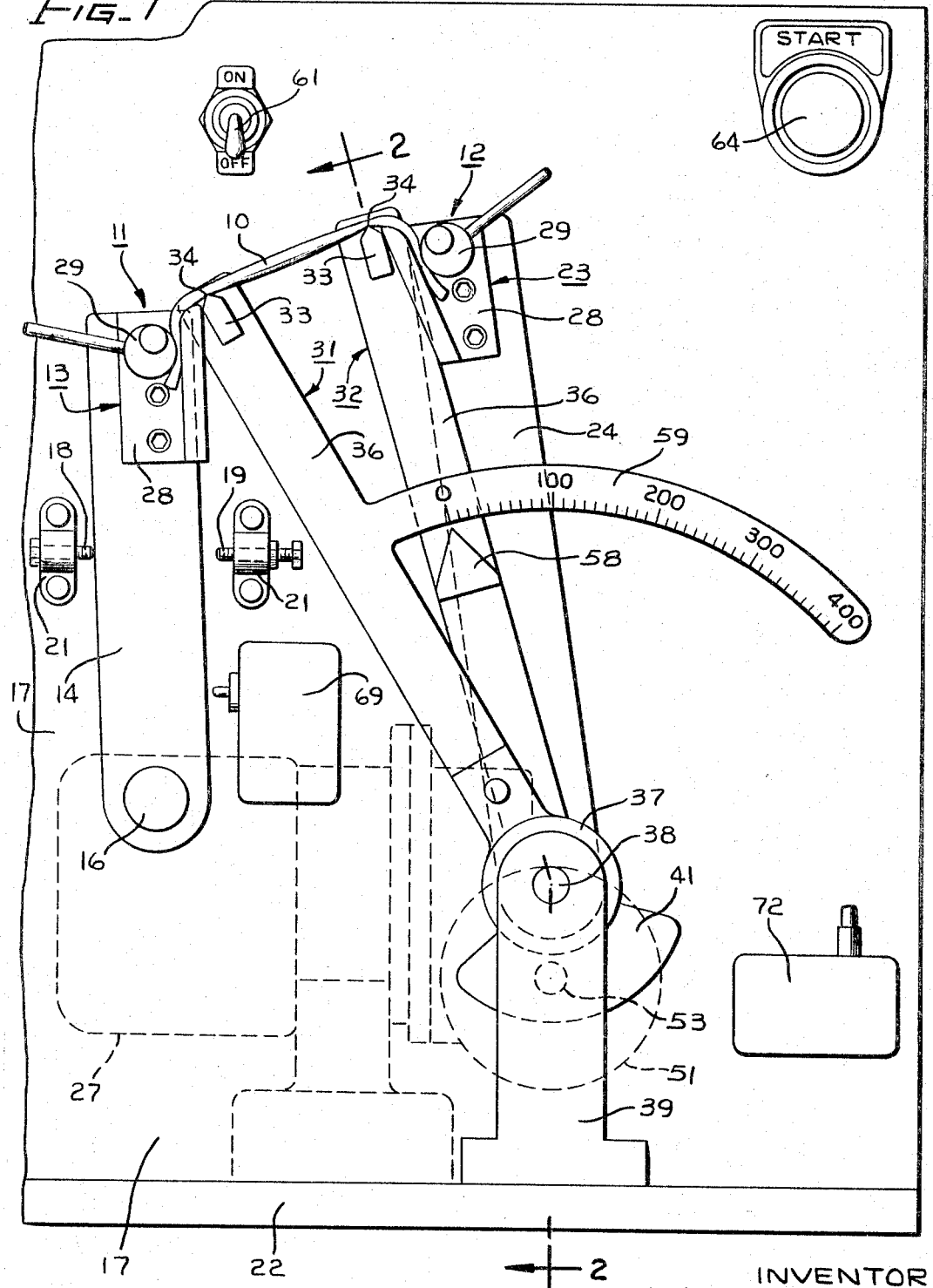
INVENTOR
J. H. SHOEMAKER
BY D. D. Booker
ATTORNEY

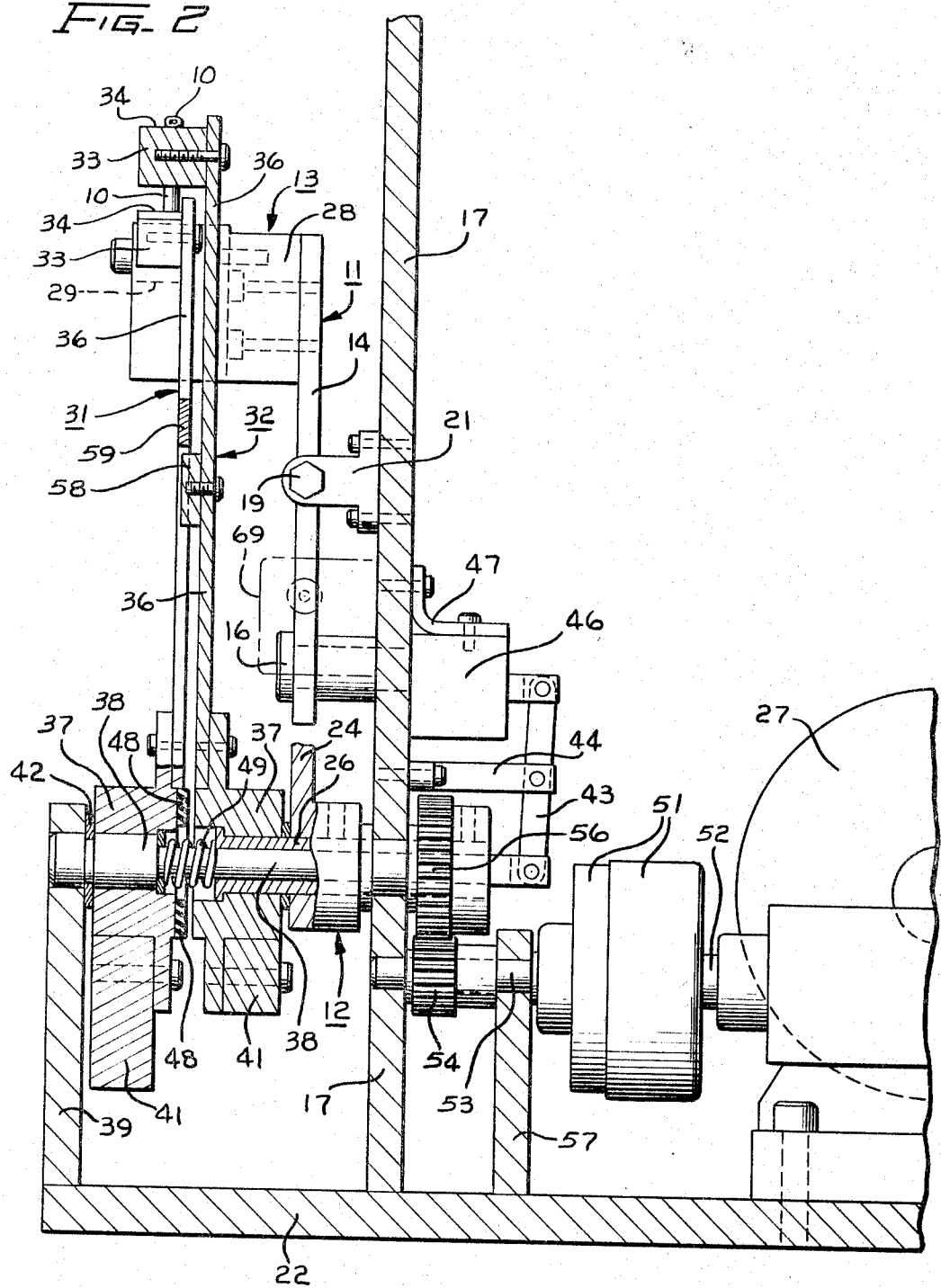

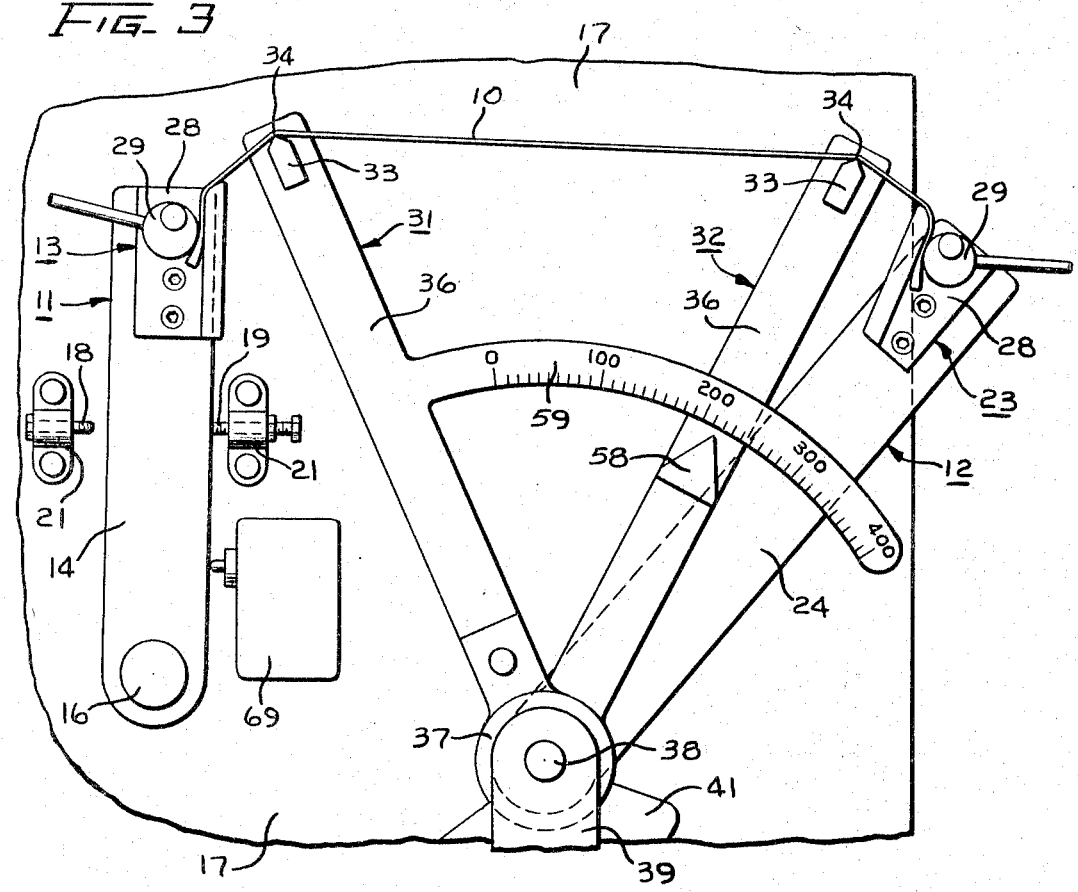
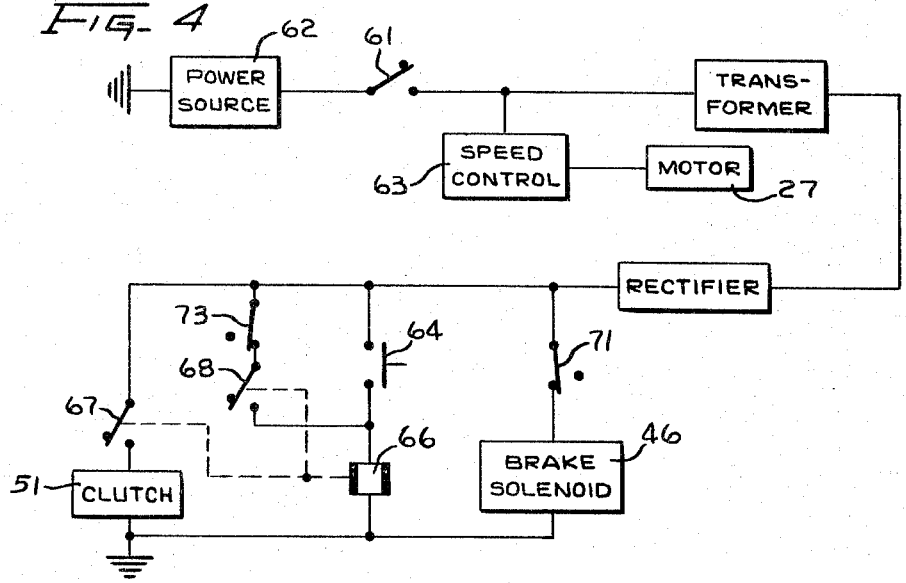

United States Patent Office 3,318,142
Patented May 9, 1967

3,318,142
DEVICE FOR DETERMINING THE ELONGATION CHARACTERISTICS OF ELONGATED ARTICLES
John H. Shoemaker, Dannebrog, Nebr., assignor to Western Electric Company, Incorporated, New York, N.Y., a corporation of New York
Filed Feb. 10, 1964, Ser. No. 343,764
5 Claims. (Cl. 73—95)

This invention relates to a device for determining the elongation characteristics of elongated articles, and more particularly to apparatus of this type in which a sample article is elongated to its breaking point. It is an object of this invention to provide a new and improved device of this character.

In the manufacture of insulated electrical conductor wire, it is standard practice to test the insulation of the wire periodically to determine whether certain elongation characteristics of the insulation meet manufacturing specifications. This is accomplished by stripping a test piece of insulation from a sample of the insulated wire, elongating a preselected length of the test strip longitudinally to its breaking point, and determining the amount which the strip has elongated when it ruptures. This value then is used for computing various elongation characteristics of the sample to determine whether the insulation meets manufacturing requirements.

Heretofore, various test devices have been used for elongating the test strip until it ruptures. In these devices the elongation of the test strip has been accomplished by clamping the test strip adjacent its ends in clamping mechanisms spaced a preselected distance apart, and then moving one of the clamping mechanisms relative to the other until the test strip breaks. When the test strip ruptures the movable clamping mechanism is locked in the position which it then occupies so that the amount of elongation of the test strip can be determined.

These prior known test devices are inaccurate and undesirable for various reasons. For example, to prevent slippage of the test strip relative to the clamping mechanisms the test strip must be gripped so tightly in the clamping mechanisms that they create excessive stresses in the test strip and cause premature failure thereof. Further, portions of the test strip gripped in clamping jaws of the clamping mechanisms tend to stretch lengthwise during the elongation process, rather than only a preselected length of the test strip between the ends of the clamping jaws being stretched lengthwise, and thus the distance traveled by the movable clamping mechanism relative to the fixed clamping mechanism is not a true indication of the elongation of the preselected length of the test strip.

Accordingly, another object of this invention is to provide a new and improved device for determining the elongation characteristics of the insulation of an electrical conductor wire.

A further object of this invention is to provide a new and improved device for determining the elongation characteristics of elongated articles which is more accurate than prior known devices.

Another object of this invention is to provide a new and improved device for determining the elongation characteristics of elongated articles in which excessive forces on the article which might cause premature rupture thereof is reduced to a minimum.

A still further object of this invention is to provide a new and improved device for determining the elongation characteristics of elongated articles which, after an elongation test of an article has been initiated, does not require attention by the operator while the test is being conducted.

In accordance with the invention, an elongated article is clamped at longitudinally spaced points thereon in first and second clamping mechanisms, and at least one of the clamping mechanisms is moved relative to the other to elongate the article to its breaking point. During the elongation of the article, other longitudinally spaced intermediate portions of the article are engaged with first and second movable index members such that the article will not slip longitudinally relative to the index members. At the begining of the test these index members are positioned a preselected distance apart and are connected to one another so as to prevent relative movement therebetween. Then, as the article begins to elongate the index members are automatically released from one another and the subsequent elongation of the article causes relative movement between the index members. Upon the breaking of the article the index members are automatically reconnected to one another so that relative movement therebetween again is prevented, and the amount which the article elongated can readily and accurately be determined by the amount of the relative movement which occurred between the index members prior to the breaking of the article.

In a preferred embodiment of the invention, longitudinally spaced points of an elongated resilient article are clamped in first and second pivoted clamping mechanisms, one of which is pivotable relative to the other to elongate the article to its breaking point. During the elongation of the article, blunt edges of pivoted index members are engageable with other longitudinally spaced intermediate portions of the article so as to prevent slippage of the article longitudinally relative to the edges. More specifically, at the beginning of a test the index members are connected to one another for movement as a unit by a brake mechanism, with the blunt edges of the index members positioned a preselected distance apart. During the initial pivotal movement of the first clamping mechanism, as the article becomes taut it is pulled into firm engagement with the blunt edges and causes the second clamping mechanism to pivot in the same direction as the first clamping mechanism. Then, just before the movement of the second clamping mechanism is interrupted by a stop mechanism so that the article will begin to elongate, the second clamping mechanism operates a switch to deactuate the brake mechanism to release the index members from one another so that the subsequent elongation of the article causes one of the index members to move relative to the other index member. Upon the breaking of the article the switch returns to its normal condition to reactuate the brake mechanism, thereby locking the index members back together so that relative movement therebetween again is precluded. The amount of elongation of the article then is determined from a scale carried on one of the index members and can be used for computing various elongation characteristics of the article.

This invention, together with further objects and advantages thereof, will best be understood with reference to the following detailed description taken in connection with the accompanying drawings in which:

FIG. 1 is a front elevational view of the device;
FIG. 2 is a cross-sectional view taken substantially along the line 2—2 of FIG. 1;
FIG. 3 is a partial front elevational view of the device in one of its operating positions; and
FIG. 4 is an electrical circuit for the device shown in FIGS. 1–3.

The illustrated embodiment of the invention is designed for determining the elongation characteristics of the insulation of an electrical conductor wire, not shown. More specifically, referring to FIGS. 1 and 3 of the drawings, it is seen that this device is designed to elongate a piece 10 of the insulation, which has been stripped from the wire, to its breaking point, and to give an accurate indication of the amount which a preselected length of the piece of insulation elongates before the piece ruptures. This value then is used to compute various elongation characteristics of the insulation, to determine whether it meets manufacturing specifications.

As is best shown in FIGS. 1 and 3, the front of the device includes a first clamping assembly 11 for clamping the test strip 10 adjacent one end thereof, and a second clamping assembly 12 for clamping the test strip adjacent its other end. The first clamping assembly 11 includes a clamp 13 carried on the upper end of a substantially vertically extending bar 14 pivoted at its lower end on a mounting pin 16 screw threaded at one end (FIG. 2) into a vertical mounting plate 17, and the bar 14 is movable between limits defined by opposed stop screws 18 and 19. The stop screws are mounted in spaced brackets 21 secured to the front of the mounting plate 17 by screws, and the lower end of the vertical mounting plate is welded or otherwise suitably secured to a horizontally extending base member 22.

The second clamping assembly 12 also includes a clamp 23 carried on the upper end of a second bar 24 which, as is best shown in FIG. 2, at its lower end is suitably secured to a horizontally extending hollow cylindrical shaft 26. The shaft 26 is journalled for rotation in the vertical mounting plate 17 and extends through the mounting plate horizontally to the right, as viewed in FIG. 2, for connection to a drive mechanism which includes a drive motor 27 supported on the base member 22.

Each of the clamps 13 and 23 includes a substantially L-shaped member 28 having portions intersecting at a right angle, one of the portions being secured by screws to its associated pivoted bar 14 or 24, and the other portion projecting forwardly from the mounting portion. A cylindrical clamping member 29 is eccentrically pivoted on the mounting portion of each of the L-shaped members 28 by means of a pin. Each clamping member 29 is pivotable in one direction to clamp the test strip 10 between the member and the forwardly extending portion of its associated L-shaped member 28, and is pivotable in a reverse direction to release the test strip, in a well-known manner.

As is best shown in FIGS. 1 and 3, a pair of index assemblies 31 and 32 are provided at the front of the device for engaging the test strip 10 intermediate the portions clamped in the clamping assemblies 11 and 12 during a test operation. Each of the index assemblies 31 and 32 includes an index element 33 having an upper blunt article engaging edge 34. The index elements 33 are mounted by screws (FIG. 2) on respective index arms 36 adjacent the upper ends of the arms, and as is best shown in FIG. 2, the lower ends of the index arms are secured by screws to respective low friction bearings 37.

The bearing 37 of the index assembly 31 is journalled on a horizontally reciprocal shaft 38 supported at its left-hand end, as viewed in FIG. 2, in the upper end of a vertical support 39 which at its lower end is suitably secured, as by screws, to the base member 22. The bearing 37 of the index assembly 32 is journalled on the hollow shaft 26. Each of the bearings 37 has a counterweight 41 secured to its underside by a screw so that the index assemblies 31 and 32 are free floating on the shafts 26 and 38, and have no tendency to pivot about the shafts by gravity.

The index assemblies 31 and 32 can be connected together for pivotal movement as a unit and so as to prevent relative movement therebetween for reasons that subsequently will become apparent. Thus, adjacent the left-hand end (FIG. 2) of the reciprocal shaft 38 a retaining ring 42 for limiting axial movement of the bearing 37 of the index assembly 31 relative to the shaft is fixedly mounted on the shaft in a suitable manner, as for example in a circumferentially extending groove therein. Further, an elongated reduced portion of the reciprocal shaft 38 extends to the right, as viewed in FIG. 2, axially through the hollow shaft 26 and has its right-hand end connected to the lower end of an operating lever 43. The lever 43 is pivoted intermediate its ends on a bracket 44 secured to the vertical mounting plate 17 by screws, and the upper end of the lever is pivoted to an armature of a solenoid 46 mounted on the vertical mounting plate 17 by a bracket 47.

When the various parts of the device are positioned as shown in FIG. 2, the index assemblies 31 and 32 are free to pivot relative to one another. However, when the solenoid 46 is energized in a manner to be described, its armature moves to the left, as viewed in FIG. 2, to move the reciprocal shaft 38 and the index assembly 31 to the right. This movement of the index assembly 31 brings a brake lining 48 suitably bonded to its bearing 37, and of a suitable material such as neoprene rubber, into firm engagement with the bearing 37 of the other index assembly 32 to lock the assemblies together as a unit. When the solenoid 46 is de-energized the bearings 37 are released from one another and the index assemblies 31 and 32 again are free to pivot relative to one another. The releasing of the bearings 37 from one another is facilitated by a coil or other suitable type spring 49 which encircles the reduced portion of the reciprocal shaft 38 as shown in FIG. 2 for continuously urging the bearings 37 apart to take up any slack therebetween.

The mechanism for driving the hollow shaft 26, in addition to the drive motor 27, includes an electromagnetic clutch 51 (FIGS. 2 and 4), which may be of any suitable type, having a drive element secured to a drive shaft 52 of the motor and a driven element secured to a rotatable shaft 53. The shaft 53 has a toothed gear 54 keyed or otherwise suitably secured thereto and the gear meshes with another toothed gear 56 suitably secured to the hollow shaft 26. The shaft 53 is journalled in the vertical mounting plate 17 and an upstanding support 57 which at its lower end is suitably secured, as by screws, to the base member 22.

In preparing for a test, the index assemblies 31 and 32 are pivoted to the positions shown in FIG. 1 so that a pointer 58 on the index arm 36 of the index assembly 32 is in registration with a zero marking on a scale 59 integral with the index arm 36 of the index assembly 31, the zero marking being located on the scale so that when the index arms are thus positioned the test strip engaging edges 34 on the index elements 33 are a preselected distance apart.

A toggle switch 61 mounted at the top front of the vertical mounting plate 17 then is moved to an "on" position to connect the device to a power source 62 (FIG. 4), thereby causing energization of the solenoid 46 to cause the index assemblies 31 and 32 to be locked together as a unit as above described. The test strip 10 then may be clamped in the clamping assemblies 11 and 12 as shown in FIG. 1 with portions of the test strip 10 between the portions clamped in the clamping assemblies engaged with (or slightly spaced from) the blunt edges 34 of the index elements 33.

As is best shown in FIG. 4, the closing of the toggle switch 61, in addition to energizing the brake solenoid 46, also energizes the drive motor 27 through a speed control unit 63. Accordingly, when the test strip 10 has been clamped in the device as shown in FIG. 1, a start button 64 mounted at the top front of the vertical mounting plate 17 next is operated to energize a relay 66 (FIG. 4) which closes a normally open contact 67 to energize the electromagnetic clutch 51, and which closes a normally open contact 68 to lock itself in. The motor 27, through the clutch 51, the rotatable shaft 53 and the gears 54 and 56, then begins to rotate the hollow shaft 26 to move the clamping assembly 12 clockwise from the position shown in FIG. 1 toward and beyond the position shown in FIG. 3 to elongate the test strip 10 to its breaking point.

The initial portion of the movement of the clamping assembly 12 pulls the test strip 10 to the right, as viewed in FIG. 1, and as the strip becomes taut the clamping assembly 11 also is pulled to the right toward the stop screw 19. At substantially the same time, the test strip 10 is being pulled downward (FIG. 1) into firm engagement with the blunt edges 34 of the index elements 33 in directions substantially radially inward with respect to the index arms 36 such that the test strip will not slip longitudinally relative to the edges during the subsequent elongation of the strip.

As the test strip 10 becomes firmly engaged with the blunt edges 34, the index assemblies 31 and 32, which are locked together, tend to be moved by the test strip clockwise (FIG. 1) as a unit until the pivoted bar 14 of the clamping assembly 11 engages a switch 69 and opens a normally closed contact 71 (FIG. 4) thereof to de-energize the brake solenoid 46, thereby releasing the index assemblies from one another. The bar 14 then engages the stop screw 19 to stop the movement of the clamping assembly 11 and the test strip 10 begins to elongate. Thus, as the clamping assembly 12 continues to be moved clockwise toward and beyond the position shown in FIG. 3 to elongate the test strip 10 to its breaking point, while both of the index assemblies 31 and 32 are pivoted clockwise as the test strip 10 elongates, the index assembly 32 is moved relative to the index assembly 31 by an amount corresponding to the elongation of the portion of the test strip between the blunt edges 34 of the index elements 33. The switch 69 is suitably mounted on the vertical mounting plate 17, and the stop screw 19 and the switch are adjusted so that the pivoted bar 14 engages the switch to open the contact 71 just before the pivoted bar engages the stop screw.

As the hollow shaft 26 and the clamping assembly 12 thereon are driven beyond the position shown in FIG. 3, the test strip 10 becomes elongated to the point that it ruptures. When this occurs, the pulling force on the clamping assembly 11 is released and the bar 14, which is substantially balanced about the pin 16 when engaged with the stop 19, is pivoted counterclockwise, as viewed in FIG. 3, by the spring action in the switch 69, thereby permitting the contact 71 of the switch to reclose to re-energize the brake solenoid 46. Accordingly, substantially at the instant that the test strip 10 ruptures the index assemblies 31 and 32 again are locked together such that relative movement therebetween is precluded. Thus, from the reading of the pointer 58 on the scale 59 the amount of elongation of the portion of the test strip 10 between the blunt edges 34 of the index assemblies 31 and 32 readily can be determined.

The movement of the hollow shaft 26 and the clamping assembly 12 by the motor 27 through the clutch 51, the shaft 53 and the gears 54 and 56, is limited by a switch 72 (FIG. 1) mounted on the front of the vertical mounting plate 17 in any suitable manner. In this regard, the switch 72 includes a normally closed contact 73 (FIG. 4) which is opened to drop out the relay 66 when the arm 24 of the clamping assembly 12 engages the switch, thus permitting the contact 67 to open to de-energize the clutch 51.

During a test operation, since the test strip 10 is stretching on both sides of each of the blunt edges 34 of the index elements 33, the tendency for the test strip to slip longitudinally relative to either of the index elements is relatively slight. Accordingly, the blunt edges 34, which are firmly engaging the test strip 10, can substantially prevent slippage of the strip relative to the index elements 33 without excessive deformation of the test strip and without causing excessive extraneous stresses in the test strip which might cause premature rupture thereof, and thus a true indication of the elongation capability of the portion of the test strip between the blunt edges is obtained. However, suitable clamping members on the index arms 36 for exerting slight clamping pressure on the test strip 10 for holding it against slippage relative to the index elements 33 may be provided if so desired.

Further, with the arrangement in which the test strip 10 extends between the clamps 13 and 23 over the index assemblies 31 and 32, rather than directly between the clamps as in prior known devices, the tendency for the test strip to pull out of the clamps, and thus the stresses created in the test strip by the clamps, is substantially reduced. In addition, as shown in FIGS. 1 and 3 of the drawings, with this arrangement portions of the test strip 10 between the clamping members 29 and the blunt edges 34 of the index elements 33 can be arranged to extend about arcuate surfaces of the forwardly projecting portions of the L-shaped members 28, thereby further reducing the tendency for the test strip to pull out of the clamps 13 and 23 and thus further alleviating the stresses in the portions of the test strip clamped between the clamping members and the forwardly projecting portions. In this regard, in conducting tests with the embodiment of the invention shown in the drawings, it has been found that the rupture of the test strips 10 consistently occur in the portions of the test strips between the blunt edges 34, rather than those portions of the test strips clamped in the clamps 13 and 23, as is common in prior known devices.

It is also apparent that any tendency for the portions of the test strip 10 clamped between the clamping members 29 and the forwardly projecting portions of the L-shaped members 28 to slip or elongate will have no effect on the accuracy of the test results. Further in this regard, since the accuracy of the test is not dependent upon clamping the test strip 10 in the clamps 13 and 23 so tightly as to preclude any slippage of the test strip longitudinally in the clamps, the amount of clamping pressure on the test strip and the stresses created in the test strip thereby can be substantially reduced as compared to prior known devices.

The speed control unit 63 for the motor 27 may be of any suitable type designed to cause the motor to run at a preselected rate, and preferably is of the type which will cause the motor to run at one rate for a certain portion of the test and then at a different rate for the remaining portion of the test. For example, the model SH-14 motor speed control unit manufactured by the Minarik Electrical Corporation of Los Angeles, Calif., has been found suitable for this purpose.

For greatest accuracy the inertia of each of the index assemblies 31 and 32 should be as low as possible. Thus, where extreme accuracy is required it may be desirable to utilize ball or roller type bearings instead of the sleeve type bearings 37 as shown in the drawings. Further, it may be desirable to construct the index arms 36, including the index members 33, the pointer 58 and the scale 59, of a light weight material such as aluminum, and to provide the index arms with suitable apertures (not shown) therethrough to reduce the weight thereof.

While the illustrated embodiment of the invention is shown in the drawings in a substantially vertical position, it is apparent that the device could be disposed horizontally so that the clamping assemblies 11 and 12 and the index assemblies 31 and 32 would operate in horizontal planes. With this arrangement, the counterweights 41 on the index assemblies 31 and 32 could be eliminated. A disadvantage of this arrangement, however, is that dust and other debris may tend to accumulate on the various parts of the device, such as the mounting plate 17, the pivoted bars 14 and 24 and the index arms 36, as compared to the vertical arrangement shown in the drawings, thus producing a maintenance problem.

In operation, the index assemblies 31 and 32 are positioned as shown in FIG. 1. The toggle switch 61 then is moved to its "on" position, which energizes the solenoid 46 (FIG. 2), thereby causing the pivoted lever 43 to move the reciprocal shaft 38 and the index assembly 31 to the right, as viewed in FIG. 2, to lock the index assemblies 31 and 32 together as a unit.

The test strip 10 then is clamped in the device as shown in FIG. 1 and the start button 64 is operated to energize the relay 66 (FIG. 4), thereby energizing the electromagnetic clutch 51. The motor 27, under the control of the speed control unit 63 (FIG. 4), then begins to drive the hollow shaft 26 to move the clamping assembly 12 clockwise from the position shown in FIG. 1 toward and beyond the position shown in FIG. 3 to elongate the test strip 10 to its breaking point.

During the initial portion of the movement of the clamping assembly 12, as the test strip 10 becomes taut the clamping assembly 11 is pulled to the right (FIG. 1) toward the stop screw 19. At substantially the same time, the test strip 10 is being pulled downward (FIG. 1) into firm non-slipping engagement with the blunt edges 34 of the index elements 33.

As the test strip 10 becomes firmly engaged with the blunt edges 34 of the index elements 33, the locked index assemblies 31 and 32 tend to be pivoted clockwise (FIG. 1) as a unit by the test strip 10 until the pivoted bar 14 of the clamping assembly 11 engages the switch 69 to open the contact 71 (FIG. 4), thereby de-energizing the brake solenoid 46 so that the index assemblies 31 and 32 are released from one another. The bar 14 then engages the stop screw 19 to stop movement of the clamping assembly 11 and the test strip 10 begins to be elongated.

When the test strip 10 ruptures the clamping mechanism 11 and the bar 14 are pivoted counterclockwise, as viewed in FIG. 3, by the spring action in the switch 69, and the normally closed contact 71 (FIG. 4) of the switch recloses to re-energize the brake solenoid 46, thereby locking the index assemblies 31 and 32 back together such that further relative movement therebetween is precluded. Subsequently, the movement of the clamping assembly 12 is stopped by the pivoted bar 24 thereof engaging the limit switch 72 (FIG. 1) to open its normally closed contact 73 (FIG. 4), thus dropping out the relay 66 to de-energize the clutch 51.

The reading of the pointer 58 on the scale 59, which is indicative of the amount of elongation of the portion of the test strip 10 between the blunt edges 34 of the index elements 33, and which can be used for computing various elongation characteristics of the article as noted hereinabove, then can be determined. After the reading has been obtained the toggle switch 61 is turned to its "off" position, thereby de-energizing the brake solenoid 46 to release the index assemblies 31 and 32 from one another, and the device can be used to test a new piece of insulation 10.

While one embodiment of the invention has been disclosed, many modifications will be apparent and it it is intended that the invention be interpreted as including all modifications which fall within the true spirit and scope of the invention.

What is claimed is:

1. A device for elongating an elongated article to its breaking point for determining the elongation characteristics of the article, which comprises:

first and second movable clamping mechanism for clamping the article at longitudinally spaced points thereon;

first and second index members movable relative to one another and to said clamping mechanisms, said index members being firmly engageable with longitudinally spaced portions of the article intermediate the portions of the article clamped in said clamping mechanisms in a manner such as to prevent slippage of the article longitudinally relative to said index members during the elongation of the article, said first clamping mechanism being movable relative to said second clamping mechanism to elongate the article to its breaking point, and said second clamping mechanism and said index members being movable by the article in the same direction as said first clamping mechanism;

releasable means for connecting said index members to one another for movement as a unit and so as to prevent relative movement therebetween, with said index members being positioned a preselected distance apart;

stop means for limiting the movement of said second clamping mechanism with said first clamping mechanism so that the article begins to elongate; and means responsive to the movement of said second clamping mechanism with said first clamping mechanism just prior to the cessation of the movement of said second clamping mechanism by said stop means, for releasing said releasable connecting means so that the subsequent elongation of the portion of the article between said index members causes one of said index members to move relative to the other of said index members, and responsive to the breaking of the article, for operating said connecting means to reconnect said index members to one another to prevent further relative movement therebetween, whereby the elongation of the portion of the article between said index members readily can be determined by the amount of the movement of said one index member relative to the other.

2. A device for elongating an elongated article to its breaking point for determining the elongation characteristics of the article, which comprises:

first and second clamping mechanisms for clamping the article at longitudinally spaced points thereon, at least one of said clamping mechanisms being pivotable relative to the other of said clamping mechanisms to elongate the article to its breaking point;

first and second index members pivoted for movement relative to one another and to said clamping mechanisms, said index members being firmly engageable with longitudinally spaced portions of the article intermediate the portions of the article clamped in said clamping mechanisms in a manner such as to prevent slippage of the article longitudinally relative to said index members during the elongation of the article;

releasable means for connecting said index members to one another so as to prevent relative movement therebetween, with said index members being positioned a preselected distance apart; and means for releasing said releasable connecting means as the article begins the elongate so that the subsequent elongation of the portion of the article between said index members causes relative movement between said index members, and for operating said connecting means upon the breaking of the article to reconnect said index members to one another to prevent further relative movement therebetween, whereby the elongation of the portion of the article between said index members can be determined by the amount of the relative movement between said index members prior to the breaking of the article.

3. A device for elongating an elongated article to its breaking point for determining the elongation characteristics of the article, as recited in claim 2, in which said first and second index members are pivoted for movement relative to one another and to said clamping mechanisms about a common axis parallel to the pivotal axis of said one clamping mechanism.

4. A device for elongating an elongated article to its breaking point for determining the elongation characteristics of the article, which comprises:

first and second clamping mechanisms for clamping the article at longitudinally spaced points thereon, at least one of the clamping mechanisms being pivotable relative to the other of said clamping mechanisms to elongate the article to its breaking point;

first and second index members pivoted for movement relative to one another and said clamping mechanisms about a common axis parallel to the pivotal axis of said one clamping mechanism;

blunt article engaging edges on said index members, said edges being located on said index members with respect to said clamping mechanisms such that as said one clamping mechanism is pivoted and the article initially becomes taut longitudinally spaced portions of the article intermediate the portions of the article clamped in said clamping mechanisms are pulled into firm engagement with said edges in directions substantially radially inward with respect to said index members such that the article will not slip longitudinally relative to said edges and said index members during the elongation of the article;

releasable means for connecting said index members to one another for movement as a unit and so as to prevent relative movement therebetween, with said edges positioned a preselected distance apart; and means for releasing said releasable connecting means as the article begins to elongate so that the subsequent elongation of the portion of the article between said edges causes relative movement between said index members, and for operating said connecting means upon the breaking of the article to reconnect said index members to one another to prevent further relative movement therebetween, whereby the elongation of the portion of the article between said edges can be determined by the amount of the relative movement between said index members prior to the breaking of the article.

5. A device for elongating an elongated resilient article to its breaking point for determining the elongation characteritsics of the article, which comprises:

first and second clamping mechanisms for clamping the article at longitudinally spaced points thereon and mounted for pivotal movement relative to one another about spaced parallel axes;

first and second index members pivoted for movement relative to one another and said clamping mechanisms about the axis of said first clamping mechanism;

blunt article engaging edges on said index members;

a brake mechanism for connecting said index members together for movement as a unit and so as to prevent relative movement therebetween, with said edges positioned a preselected distance apart;

a drive mechanism for pivoting said first clamping mechanism at a preselected rate relative to said second clamping mechanism and said index members to elongate the article to its breaking point, said edges being located on said index members with respect to said clamping mechanisms such that as said first clamping mechanism is pivoted and the article initially becomes taut longitudinally spaced portions of the article intermediate the portions of the article clamped in said clamping mechanisms are pulled into firm engagement with said edges of said connected index members in directions substantially radially inward with respect to said index members such that the article will not slip longitudinally relative to said edges and said index members during the elongation of the article, and said second clamping mechanism and said connected index members being pivotable by the article in the same direction as said first clamping mechanism;

stop means for limiting the pivotal movement of said second clamping mechanism with said first clamping mechanism so that the article begins to elongate, said clamping mechanism being subtsantially balanced about its pivotal axis when engaged with said stop means;

a switch operable by said second clamping mechanism just prior to the cessation of the movement of said clamping mechanism by said stop means, to deactuate said brake mechanism so that the subsequent elongation of the portion of the article between said edges causes one of said index members to move relative to the other of said index members, said switch also being operable upon the breaking of the article to move said clamping mechanism in a reverse direction away from said stop means and to operate said brake mechanism to reconnect said index members back together, to prevent further relative movement therebetween; and a scale on one of said index members for indicating the amount of relative movement between said index members during the elongation of the article.

References Cited by the Examiner
UNITED STATES PATENTS 2,065,359   12/1936   Zechmeister _____ 73—95
2,154,280   4/1939    Nadai et al. _____ 73—95 X RICHARD C. QUEISSER, Primary Examiner.

J. W. MYRACLE, Assistant Examiner.